C. KRIKAVA.
AUTOMOBILE TIRE.
APPLICATION FILED MAY 20, 1913.
1,076,127.
Patented Oct. 21, 1913.
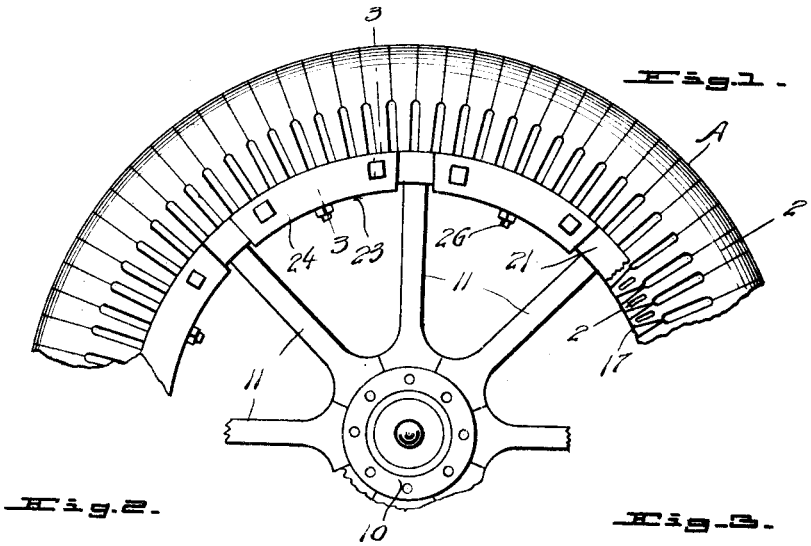
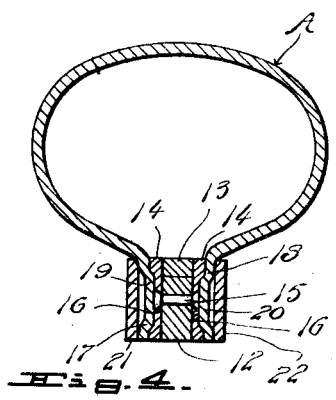
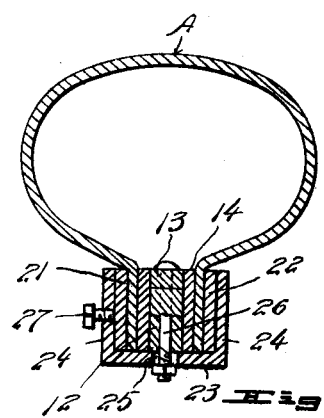
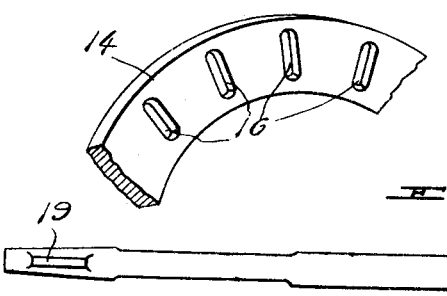
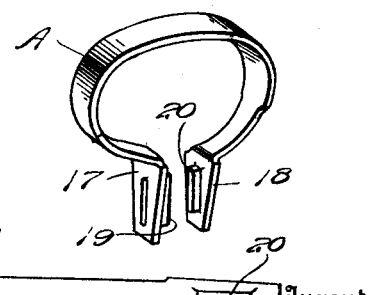
Witnesses
Inventor
C. Krikava.

UNITED STATES PATENT OFFICE

CHARLES KRIKAVA, OF BURCHARD, NEBRASKA.

AUTOMOBILE-TIRE.

1,076,127.

Specification of Letters Patent.

Patented Oct. 21, 1913.

Application filed May 20, 1913. Serial No. 768,807.

*To all whom it may concern:*

Be it known that I, CHARLES KRIKAVA, a citizen of the United States, residing at Burchard, in the county of Pawnee, State of Nebraska, have invented certain new and useful Improvements in Automobile-Tires; and I do hereby declare the following to be a full, clear, and exact description of the invention, such as will enable others skilled in the art to which it appertains to make and use the same.

This invention relates to automobile tires.

The object of the invention resides in the provision of an automobile tire which may be used in lieu of a pneumatic tire for the purpose of avoiding the disadvantage of punctures and which will efficiently absorb the shocks and jars incident to travel.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side elevation of a fragment of an automobile wheel having the improved tire associated therewith; Fig. 2, a section on the line 2—2 of Fig. 1; Fig. 3, a section on the line 3—3 of Fig. 1; Fig. 4, a detail perspective view of a fragment of one of the rings with which the terminals of the springs interlock; Fig. 5, a detail perspective view of one of the springs, and Fig. 6, a view of the blank from which each spring is formed.

Referring to the drawings 10 indicates the hub of an automobile wheel from which radiate spokes 11. Supported upon the outer ends of the spokes 11 is a rim or felly 12 and surrounding this rim or felly is a tire 13. Disposed against respective sides of the rim or felly 12 are annular plates 14 which are secured in place by rivets 15 passing through said plates and through the rim or felly 12. Formed in the outer sides of each of the plates 14 are radially disposed recesses 16 for a purpose that will presently appear. The tire further comprises a plurality of springs A each of which is formed from a metal blank bent into substantially circular shape and having its free ends bent outwardly in spaced relation as at 17 and 18. These free ends 17 and 18 are provided with inwardly directed struck up portions 19 and 20. The normal distance between the ends 17 and 18 of each spring is less than the combined width of the plates 14 and felly 12. In applying the springs A the ends 17 and 18 are spread apart and positioned in embracing relation to the plates 14 and felly 12 and the struck up portions 19 and 20 are brought into registration with recesses 16 of respective plates 14 when the tendency of the ends 17 and 18 to move together will cause the struck up portions 19 and 20 to snap into respective recesses 16. In this manner the springs A are applied until the rim 12 is entirely surrounded and a continuous spring tread for the tire is formed. Disposed against the ends 17 of the springs A is a locking plate 21, while a corresponding locking plate 29 is disposed against the ends 18 of said spring. Disposed between adjacent spokes 11 and embracing the plates 21 and 22, spring ends 17 and 18, plates 14 and rim 12 are U-shaped members including a bight portion 23 and arms 24. The bight portion 23 of each of these U-shaped members is provided with a transversely elongated bolt opening 25 through which is engaged a bolt 26 passing through the tire 13 and rim 12. Mounted in each of the arms 24 are set screws 27 which operate respectively against the plates 21 and 22 to lock the various parts of the tire together as will be obvious. It will be noted that the elongated opening 25 permits of lateral movement of the U-shaped members when the set screws 27 are operated to force the plates 21 and 22 against respective ends 17 and 18 of the springs A.

From the foregoing construction it will be apparent that if any one of the springs A should become broken the U-shaped member and locking plates 21 and 22 can be removed and a new spring applied, the engagement of the struck up portions 19 and 20 in the recesses 16 serving to hold the remaining springs in place during the application of a new spring for the broken one.

What I claim is:—

A resilient tire comprising a rim, plates secured against each side of the rim and provided respectively with radial recesses in their outer sides, a plurality of arch leaf springs having their ends directed outwardly in spaced relation, inwardly directed portions struck up from the ends of said springs and engaging in corresponding recesses of respective plates, annular locking plates disposed against the outer sides of the ends of said springs respectively, U-shaped members embracing the rim and locking plates, and set screws mounted in the arms of the U-shaped members and operating against the locking plates to force the latter into engagement with the spring ends.

In testimony whereof, I affix my signature, in the presence of two witnesses.

CHARLES KRIKAVA.

Witnesses:
 JOSEPH KRISTUFEK,
 JOSEPH C. SCHULTZ.